United States Patent
Ash et al.

(10) Patent No.: US 10,282,303 B2
(45) Date of Patent: *May 7, 2019

(54) USING CACHE LISTS FOR PROCESSORS TO DETERMINE TRACKS TO DEMOTE FROM A CACHE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,155

(22) Filed: Jan. 30, 2018

(65) Prior Publication Data
US 2018/0157594 A1     Jun. 7, 2018

Related U.S. Application Data

(63) Continuation of application No. 14/832,596, filed on Aug. 21, 2015, now Pat. No. 10,108,552.

(51) Int. Cl.
*G06F 12/00* (2006.01)
*G06F 12/0893* (2016.01)
(Continued)

(52) U.S. Cl.
CPC ...... *G06F 12/0893* (2013.01); *G06F 12/0891* (2013.01); *G06F 12/0802* (2013.01);
(Continued)

(58) Field of Classification Search
CPC ......... G06F 2212/1024; G06F 12/0802; G06F 12/0866; G06F 12/0895; G06F 17/30132;
(Continued)

(56) References Cited

U.S. PATENT DOCUMENTS 4,574,346 A * 3/1986 Hartung ............... G06F 12/0866
711/112
4,638,425 A * 1/1987 Hartung ............... G06F 12/0866
711/133
(Continued)

OTHER PUBLICATIONS

Office Action dated Mar. 30, 2018, pp. 13, for U.S. Appl. No. 15/884,162, filed Jan. 30, 2018.
(Continued)

*Primary Examiner* — Mardochee Chery
(74) *Attorney, Agent, or Firm* — David W. Victor; Konrad Raynes Davda & Victor LLP (57) ABSTRACT

Provided are a computer program product, system, and method for using cache lists for processors to determine tracks in a storage to demote from a cache. Tracks in the storage stored in the cache are indicated in lists. There is one list for each of a plurality of processors. Each of the processors processes the list for that processor to process the tracks in the cache indicated on the list. There is a timestamp for each of the tracks indicated in the lists indicating a time at which the track was added to the cache. Tracks indicated in each of the lists having timestamps that fall within a range of timestamps are demoted

20 Claims, 7 Drawing Sheets

(51) Int. Cl.

| | | |
|---|---|---|
| *G06F 12/0891* | (2016.01) | |
| *G06F 12/0866* | (2016.01) | |
| *G06F 12/122* | (2016.01) | |
| *G06F 17/30* | (2006.01) | |
| *G06F 12/128* | (2016.01) | |
| *G06F 12/123* | (2016.01) | |
| *G06F 12/0895* | (2016.01) | |
| *G06F 12/0802* | (2016.01) | |

(52) U.S. Cl.
CPC ...... *G06F 12/0866* (2013.01); *G06F 12/0895* (2013.01); *G06F 12/122* (2013.01); *G06F 12/123* (2013.01); *G06F 12/128* (2013.01); *G06F 17/30132* (2013.01); *G06F 2212/1024* (2013.01); *G06F 2212/1044* (2013.01); *G06F 2212/60* (2013.01)

(58) Field of Classification Search
CPC ........... G06F 12/123; G06F 2212/1044; G06F 12/122; G06F 12/128; G06F 12/0893
USPC ......................................................... 711/133
See application file for complete search history.

(56) References Cited

U.S. PATENT DOCUMENTS

| | | | |
|---|---|---|---|
| 5,542,066 | A | 7/1996 | Mattson et al. |
| 5,717,893 | A | 2/1998 | Mattson |
| 5,742,792 | A | 4/1998 | Yanai et al. |
| 5,889,935 | A | 3/1999 | Ofek et al. |
| 6,012,126 | A | 1/2000 | Aggarwal et al. |
| 6,052,797 | A | 4/2000 | Ofek et al. |
| 6,327,644 | B1 | 12/2001 | Beardsley et al. |
| 6,615,318 | B2 | 9/2003 | Jarvis et al. |
| 6,851,024 | B1* | 2/2005 | Wilkes ................ G06F 12/0866 711/122 |
| 6,965,970 | B2 | 11/2005 | Mosur et al. |
| 7,260,679 | B2 | 8/2007 | Benhase et al. |
| 9,665,493 | B2 | 5/2017 | Ash et al. |
| 9,710,398 | B2 | 7/2017 | Ash et al. |
| 9,921,974 | B2 | 3/2018 | Ash et al. |
| 2008/0021853 | A1 | 1/2008 | Modha et al. |
| 2013/0097387 | A1 | 4/2013 | Sanchez Martin et al. |
| 2013/0111133 | A1* | 5/2013 | Benhase ............. G06F 12/0888 711/122 |
| 2013/0185502 | A1* | 7/2013 | Ash ....................... G06F 12/128 711/113 |
| 2014/0082296 | A1* | 3/2014 | Ash ..................... G06F 12/0866 711/136 |
| 2014/0223106 | A1 | 8/2014 | Shivashankaraiah et al. |
| 2015/0026409 | A1* | 1/2015 | Ash ....................... G06F 12/123 711/133 |
| 2016/0098295 | A1 | 4/2016 | Ash et al. |
| 2016/0140053 | A1 | 5/2016 | Ash et al. |
| 2016/0321189 | A1 | 11/2016 | Ash et al. |
| 2017/0052822 | A1 | 2/2017 | Ash et al. |
| 2017/0052897 | A1 | 2/2017 | Ash et al. |
| 2017/0052898 | A1 | 2/2017 | Ash et al. |
| 2017/0052902 | A1 | 2/2017 | Ash et al. |
| 2017/0052903 | A1 | 2/2017 | Ash et al. |
| 2018/0150402 | A1 | 5/2018 | Ash et al. |
| 2018/0157594 | A1 | 6/2018 | Ash et al. |
| 2018/0203735 | A1 | 7/2018 | Ash et al. |

OTHER PUBLICATIONS

U.S. Appl. No. 15/919,205, filed Mar. 12, 2018.
List of IBM Patents or IBM Patent Applications Treated as Related, dated Mar. 27, 2018, pp. 2.
U.S. Appl. No. 15/884,162, filed Jan. 30, 2018.
Response dated Jul. 2, 2018, pp. 14, to Office Action dated Mar. 30, 2018, pp. 13, for U.S. Appl. No. 15/884,162, filed Jan. 30, 2018.
U.S. Appl. No. 16/008,017, filed Jun. 5, 2018.
List of IBM Patents or IBM Patent Applications Treated as Related, dated Aug. 9, 2018, pp. 2.
R. Sampson, et al., "ZCache Skew-ered", Advanced Computer Architecture Lab, University of Michigan, pp. 9, Published in Proc. of the 9th Annual Workshop on Duplicating, Deconstructing, and Debunking (2011).
B.S. Gill, et al., "SARC: Sequential Prefetching in Adaptive Replacement Cache", USENIX Association, 2005 USENIC Annual Technical Conference, 2005, pp. 16.
K. Kedzierski, et al., "Adapting Cache Partitioning Algorithms to Pseudo-LRU Replacement Policies", IEEE, 2010, pp. 12.
List of IBM Patents or IBM Patent Applications Treated as Related, dated Jan. 30, 2018, pp. 2.
U.S. Appl. No. 14/832,596, filed Aug. 21, 2015.
Office Action dated Aug. 11, 2017, pp. 24, for U.S. Appl. No. 14/832,596, filed Aug. 21, 2015.
Response dated Nov. 13, 2017, pp. 13, to Office Action dated Aug. 11, 2017, pp. 24, for U.S. Appl. No. 14/832,596, filed Aug. 21, 2015.
Notice of Allowance dated Dec. 1, 2017, pp. 15, for U.S. Appl. No. 14/832,596, filed Aug. 21, 2015.
U.S. Appl. No. 14/832,614, filed Aug. 21, 2015.
Office Action dated Jul. 18, 2017, pp. 26, for U.S. Appl. No. 14/832,614, filed Aug. 21, 2015.
Response dated Oct. 18, 2017, pp. 9, to Office Action dated Jul. 18, 2017, pp. 26, for U.S. Appl. No. 14/832,614, filed Aug. 21, 2015.
Notice of Allowance dated Nov. 3, 2017, pp. 13, for U.S. Appl. No. 14/832,614, filed Aug. 21, 2015.
U.S. Appl. No. 14/832,626, filed Aug. 21, 2015.
Office Action dated Nov. 15, 2016, pp. 29, for U.S. Appl. No. 14/832,626, filed Aug. 21, 2015.
Response dated Jul. 17, 2017, pp. 11, Office Action dated Nov. 15, 2016, pp. 29, for U.S. Appl. No. 14/832,626, filed Aug. 21, 2015.
Final Office Action dated Mar. 24, 2017, pp. 15, for U.S. Appl. No. 14/832,626, filed Aug. 21, 2015.
Response dated Jul. 22, 2017, pp. 11, to Final Office Action dated Mar. 24, 2017, pp. 15, for U.S. Appl. No. 14/832,626, filed Aug. 21, 2015.
Notice of Allowance dated Jan. 3, 2018, pp. 16, for U.S. Appl. No. 14/832,626, filed Aug. 21, 2015.
U.S. Appl. No. 14/832,642, filed Aug. 21, 2015.
Office Action dated Jul. 27, 2017, pp. 25, for U.S. Appl. No. 14/832,642, filed Aug. 21, 2015.
Response dated Oct. 27, 2017, pp. 12, to Office Action dated Jul. 27, 2017, for U.S. Appl. No. 14/832,642, filed Aug. 21, 2015.
Notice of Allowance dated Nov. 17, 2017, pp. 11, for U.S. Appl. No. 14/832,642, filed Aug. 21, 2015.
U.S. Appl. No. 14/832,670, filed Aug. 21, 2015.
Office Action dated Aug. 18, 2017, for U.S. Appl. No. 14/832,670, filed Aug. 21, 2015.
Response dated Nov. 11, 2017, pp. 16, to Office Action dated Aug. 18, 2017, for U.S. Appl. No. 14/832,642, filed Aug. 21, 2015.
Notice of Allowance dated Dec. 19, 2017, pp. 15, for U.S. Appl. No. 14/832,670, filed Aug. 21, 2015.

* cited by examiner

Cache Control Block

FIG. 4

LRU List Information

USING CACHE LISTS FOR PROCESSORS TO DETERMINE TRACKS TO DEMOTE FROM A CACHE

BACKGROUND OF THE INVENTION

1. Field of the Invention

The present invention relates to a computer program product, system, and method for using cache lists for processors to determine tracks to demote from a cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

When processes access a track in the cache, a track identifier of the accessed cache needs to be moved to the MRU end of the LRU list. To move a track identifier to the MRU end, a lock needs to be obtained on the LRU list. If multiple processes are trying to access the cache, then contention for the LRU list lock among the multiple processes may delay cache processing. One technique for addressing LRU list lock contention is to defer MRU processing and perform the MRU processing to move track identifiers to the MRU end of the list in a batch mode.

SUMMARY

Provided are a computer program product, system, and method for using cache lists for processors to determine tracks in a storage to demote from a cache. Tracks in the storage stored in the cache are indicated in lists. There is one list for each of a plurality of processors. Each of the processors processes the list for that processor to process the tracks in the cache indicated on the list. There is a timestamp for each of the tracks indicated in the lists indicating a time at which the track was added to the cache. Tracks indicated in each of the lists having timestamps that fall within a range of timestamps are demoted.

DETAILED DESCRIPTION

As processing power increases, the number of independent central processing unit (CPU) threads that can separately access the cache also increases. Whenever one of the threads accesses a track in the cache, the thread needs to obtain a lock on the LRU list to move the track identifier of the accessed track to the MRU end of the LRU list. An increased number of threads accessing the cache increases contention for the LRU list lock, which may delay other processes access to the cache.

Described embodiments address the LRU list lock contention issues introduced by increasing processing capacity by having multiple LRU lists, where each processor is assigned a separate LRU list to access, having a separate LRU list lock. This reduces contention, by providing separate LRU lists for the processors to access. Further, when a track is added to the cache, the track identifier is distributed across the LRU lists for the different processors.

Described embodiments further provide techniques for demoting a batch of tracks from the LRU lists by determining a range of timestamps of tracks to demote from multiple of the LRU lists. In certain embodiments, the range of timestamps may be determined from timestamps for tracks indicated in one of the lists, and the range may be selected to reduce the tracks in cache by a predefined percentage. With the described embodiments, by demoting tracks across all the lists within the determined range of tracks, the tracks having been in cache the longest, i.e., with the oldest timestamps, are demoted first when the oldest tracks are distributed across the different LRU lists.

Figure 1:
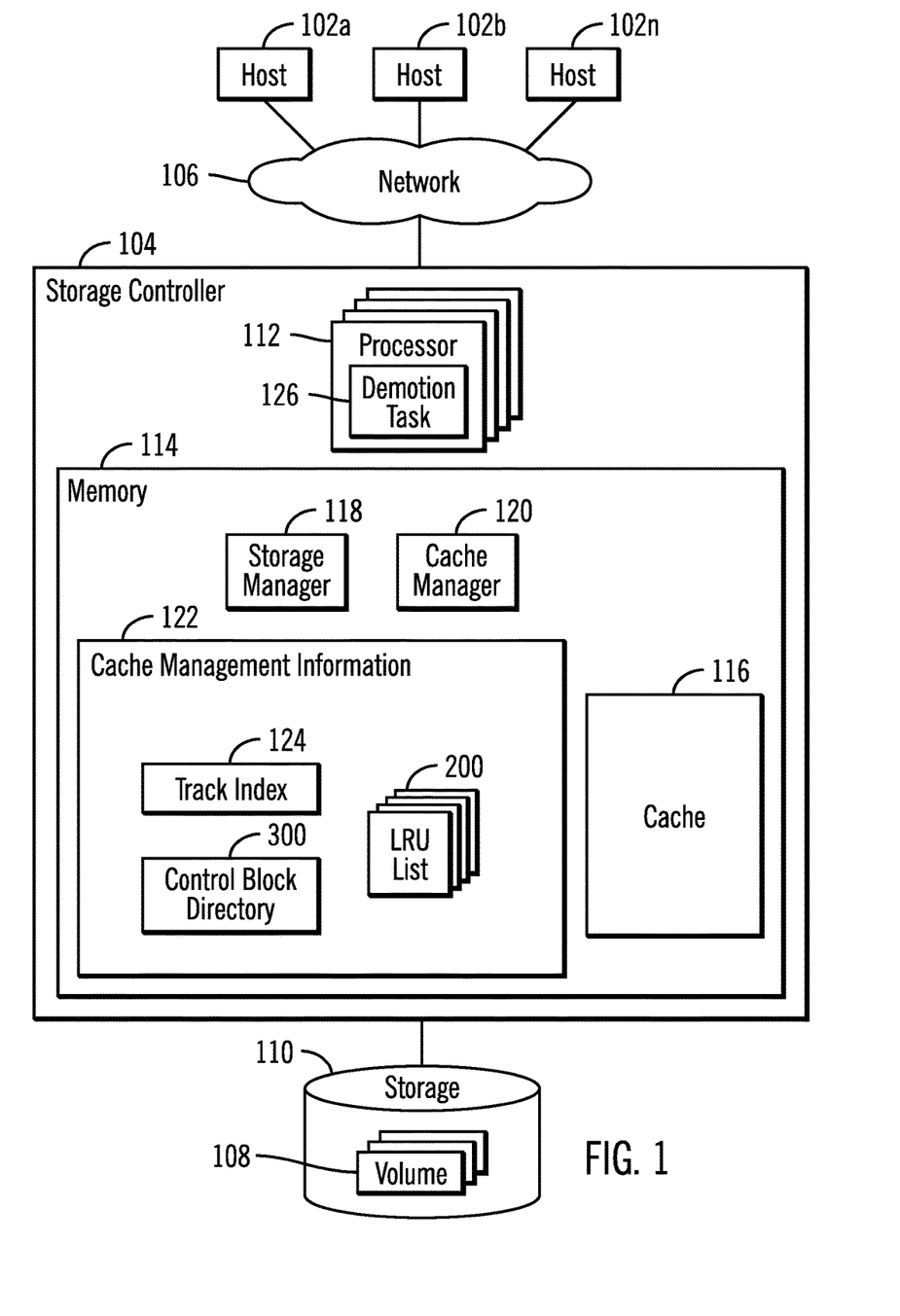
FIG. 1 illustrates an embodiment of a computing environment.

FIG. 1 illustrates an embodiment of a computing environment. A plurality of hosts 102a, 1022b . . . 102n may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes a plurality of processors 112 and a memory 114, including a cache 116 to cache data for the storage 110. Each of the processors 112 may comprise a separate central processing unit (CPU), one or a group of multiple cores on a single CPU, or a group of processing resources on one or more CPUs. The cache 116 buffers data transferred between the hosts 102a, 102b . . . 102n and the volumes 108 in the storage 110.

The memory 114 further includes a storage manager 118 for managing the transfer of tracks transferred between the hosts 102a, 102b . . . 102n and the storage 110 and a cache manager 120 that manages data transferred between the hosts 102a, 102b . . . 102n and the storage 110 in the cache 116. A track may comprise any unit of data configured in the storage 110, such as a track, Logical Block Address (LBA), etc., which is part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300 and a plurality of Least Recently Used (LRU) lists 200 providing a temporal ordering of tracks in the cache 116. In one embodiment, there is at least one LRU list 200 for each of the processors 112. In this way, each of the processors $112_i$ may independently process the LRU list $200_i$ associated with the processor $112_i$ to process the tracks in the cache indicated in the processor LRU list $200_i$. The control block directory 300 includes the cache control blocks, where there is one cache control block for each track in the cache 116 providing metadata on the track in the cache 116. The track index 124 associates tracks with the cache control blocks providing information on the tracks in the cache. Upon determining that the cache 116 is full or has reached a threshold level, the LRU lists 200 are used to determine tracks from the cache 116 to demote.

In one embodiment, the processors 112 may each invoke a demotion task $126_i$, running on processor $112_i$, to process the LRU list $200_i$ for the processor $112_i$ to determine tracks indicated on the processor LRU list $200_i$ to demote from the cache 116.

The demotion task 126 may involve discarding the track in the cache 116, such as by indicating the cache control block for the demoted track in a free queue. The cache control block for the demoted track may be selected from a free queue to use for a new track to add to the cache 116 and at that time any data from the demoted track would be overwritten by the new track. Alternatively, the demoted track may be erased immediately when demoted.

In the described embodiments, the lists 200 comprise LRU lists. In alternative embodiments, the lists 200 may comprise other types of lists to organize indication of tracks in the cache 116.

In additional embodiments, the cache management information 122 may further include a cache control block assignment that provides an assignment of cache control blocks to the processors 112, such that each processor 112 is assigned a group of cache control blocks. In this way, when a track is added to the cache 116 as a result of processing by one of the processors 112, a cache control block assigned to that processor 112 is allocated for the track in the cache 116. In one embodiment, each of the processors 112 may be assigned a range of sequential cache control block index values. Further, each processor 112 may be assigned a separate free queue to identify cache control blocks assigned to the processor 112 that are available to be allocated to tracks being added to the cache 116 by that processor 112. In yet further embodiments, tracks may be assigned to LRU lists 200 in batches, and distributed among the LRU lists to balance the load in each list.

The storage manager 118, cache manager 120, and demote task 126 are shown in FIG. 1 as program code loaded into the memory 114 and executed by one or more of the processors 112. Alternatively, some or all of the functions may be implemented in hardware devices in the storage controller 104, such as in Application Specific Integrated Circuits (ASICs).

The storage 110 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts 102a, 102b . . . 102n may connect to the storage controller 104 over a bus interface, such as a Peripheral Component Interconnect (PCI) bus interface and other interfaces known in the art.

Figure 2:
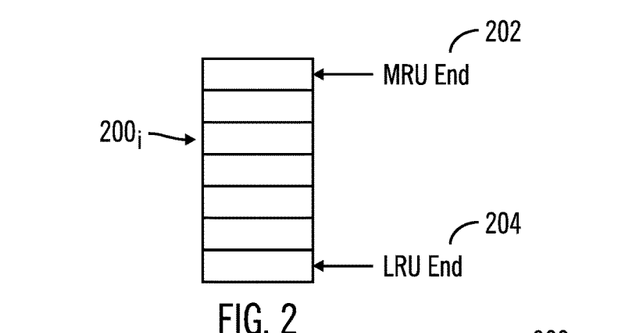
FIG. 2 illustrates an embodiment of a Least Recently Used (LRU) list.

FIG. 2 illustrates an embodiment of one of the LRU lists $200_i$ as having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_i$.

Figure 3:
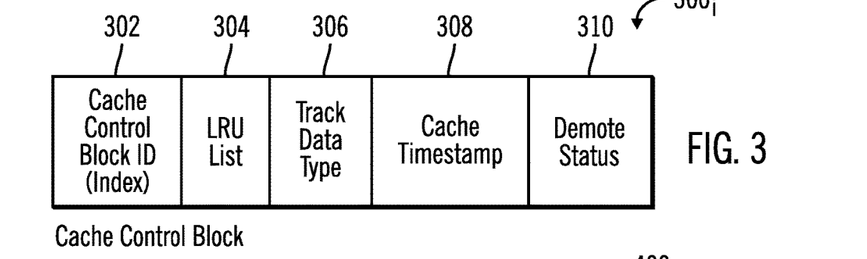
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_i$, in which the track associated cache control block $300_i$ is indicated; a track data type 306, such as unmodified sequentially accessed track, unmodified non-sequentially accessed track, etc.; a cache timestamp 308 indicating a time the track was added to the cache 116; and a demote status 310 indicating whether the track identified by the cache control block $300_i$ is to be demoted from the cache 116.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
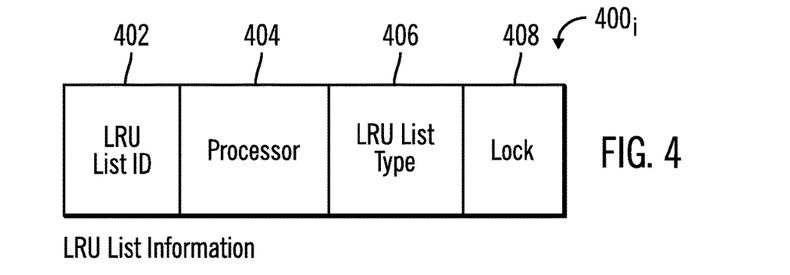
FIG. 4 illustrates an embodiment of LRU list information.

FIG. 4 illustrates an embodiment of LRU list information $400_i$, maintained for each of the LRU lists $300_i$ to provide metadata on the LRU list $300_i$, including, but not limited to, a LRU list identifier (ID) 402; a processor 404 comprising one of the processors 112 that is dedicated to processing the identified LRU list 402; an LRU list type 406 indicating a type of track managed on the LRU list 402, such as unmodified sequentially accessed track, unmodified non-sequentially accessed track, etc.; and a lock 408 that is accessed by a transaction in order to have exclusive access to the LRU list 402 for the purpose of adding track identifiers to the MRU end 202 or demoting tracks identified at the LRU end 204.

As mentioned, a track is associated with the cache control block $300_i$ providing information through the track index 124. Further, the cache control block index 302 can identify the location of the track in the cache 116, as the cache control block indexes are numbered sequentially and may provide offsets in the cache 116 at which the track is located.

In one embodiment, there may be only one set of LRU lists 200 for all the different types of data. In an alternative embodiment, there may be different sets of LRU lists for different types of data. In this way, tracks of a specific data type are managed in the LRU lists for that data type. For each data type, there are a plurality of LRU lists, one for each of the processors 112, and a cumulative counter indicating all the tracks identified in the LRU lists for the data type, i.e., all the tracks of the data type in the cache 116.

Figure 5:
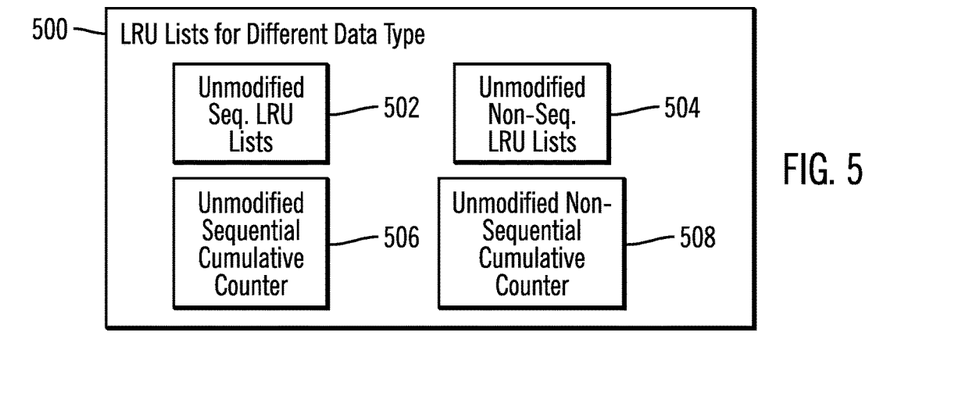
FIG. 5 illustrates an embodiment of LRU lists for different data types.

FIG. 5 illustrates an embodiment of LRU lists for different data types 500, such as unmodified sequentially accessed data and unmodified non-sequentially accessed data. In such embodiments, each of the processors 112 has one of the LRU lists for each of the different data types. For instance, there are unmodified sequential LRU lists 502, one for each of the processors 112, for unmodified sequentially accessed data staged into the cache 116, and unmodified non-sequential LRU lists 504, one for each of the processors 112, for unmodified non-sequentially accessed data staged into the cache 116. An unmodified sequential cumulative counter 506 indicates a number of unmodified sequential tracks in the cache 116 indicated on the unmodified sequential LRU lists 502 for all the processors 112. An unmodified non-sequential cumulative counter 508 indicates a number of unmodified non-sequential accessed tracks in the cache 116 indicated on the unmodified non-sequential LRU lists 504 for all the processors 112.

Figure 6:
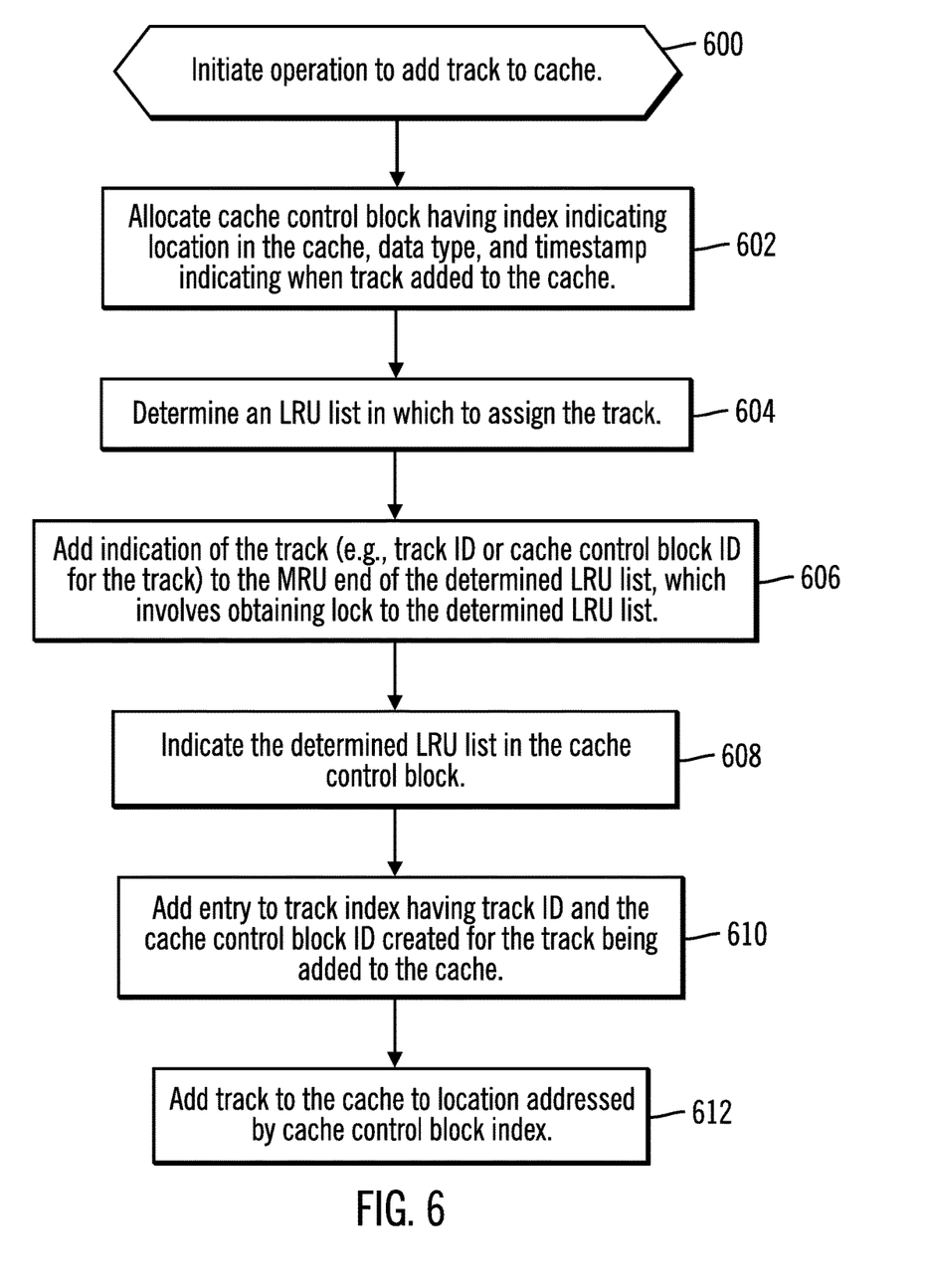
FIG. 6 illustrates an embodiment of operations to add a track to the cache.

FIG. 6 illustrates an embodiment of operations performed by the cache manager 120 to add a track to the cache 116, which may comprise a track being staged into the cache 116 from the storage 110 for read access or as part of a prefetch operation. Upon initiating (at block 600) the operation to add a track to the cache 116, a cache control block $300_i$ is allocated (at block 602) for the track having an index 302 identifying a location or offset of the track in the cache 116, the data type 306, e.g., unmodified sequential accessed data, unmodified non-sequentially accessed data, etc., and a cache timestamp 308 indicating a time, e.g., sequence number, the track was added to the cache 116. Further, the demote status 310 indicates not to demote because the track would be added to the MRU end 202 of the LRU list 200. The track may be allocated by selecting an available cache control block indicated in a free queue indicating available cache control blocks for the cache 116.

In alternative embodiments, there may be an assignment of ranges of cache control blocks to different processors and separate free queues of available cache control blocks for the different processors. In such alternative embodiments, the cache control block may be allocated from the free queue of cache control blocks assigned to the processor initiating the request to add the track or tracks to the cache 116.

The cache manager 120 determines (at block 604) an LRU list $200_i$ to which to assign the track being added to the cache 116. The LRU list $200_i$ may be selected by applying a function to the cache control block $300_i$ when the cache control block is allocated from a single free queue of available cache control blocks to evenly distribute the tracks among the LRU lists 120. Alternatively, the LRU list $200_i$ may be selected by determining the LRU list $200_i$ assigned to the cache control block $300_i$ when the cache control block is allocated based on the affinity of the processor, i.e., from the free queue specific to the processor $112_i$ that initiated the operation to add the track(s) to cache 116. Alternatively, for a batch of tracks being added to the cache, multiple LRU lists 200 may be selected for distributing tracks to the LRU lists 200 to balance the distribution of tracks assigned to LRU lists 200 for the cache 116.

The cache manager 120 adds (at block 606) indication of the track (e.g., such as a track ID or cache control block ID, e.g., index, for the track) to the MRU end 202 of the determined LRU list $200_i$. The cache manager 120 may obtain the lock 408 on the determined LRU list $200_i$ in order to add the track ID to the MRU end 202 of the LRU list $200_i$. The determined LRU list $200_i$ is indicated (at block 608) in field 304 of the cache control block $300_i$. An entry is added (at block 610) to the track index 124 associating the track ID with the cache control block $300_i$ created for the track being added to the cache 116. The track is added (at block 612) to the cache 116 to a location addressed by the cache control block index.

In embodiments where there are different types of lists, such as in FIG. 5, the cache manager 120 may first determine the data type of the track to add to the cache 116 and then add the track to one of the LRU lists 502, 504, for that determined data type and indicate the determined data type in the cache control block $300_i$.

Figure 7:
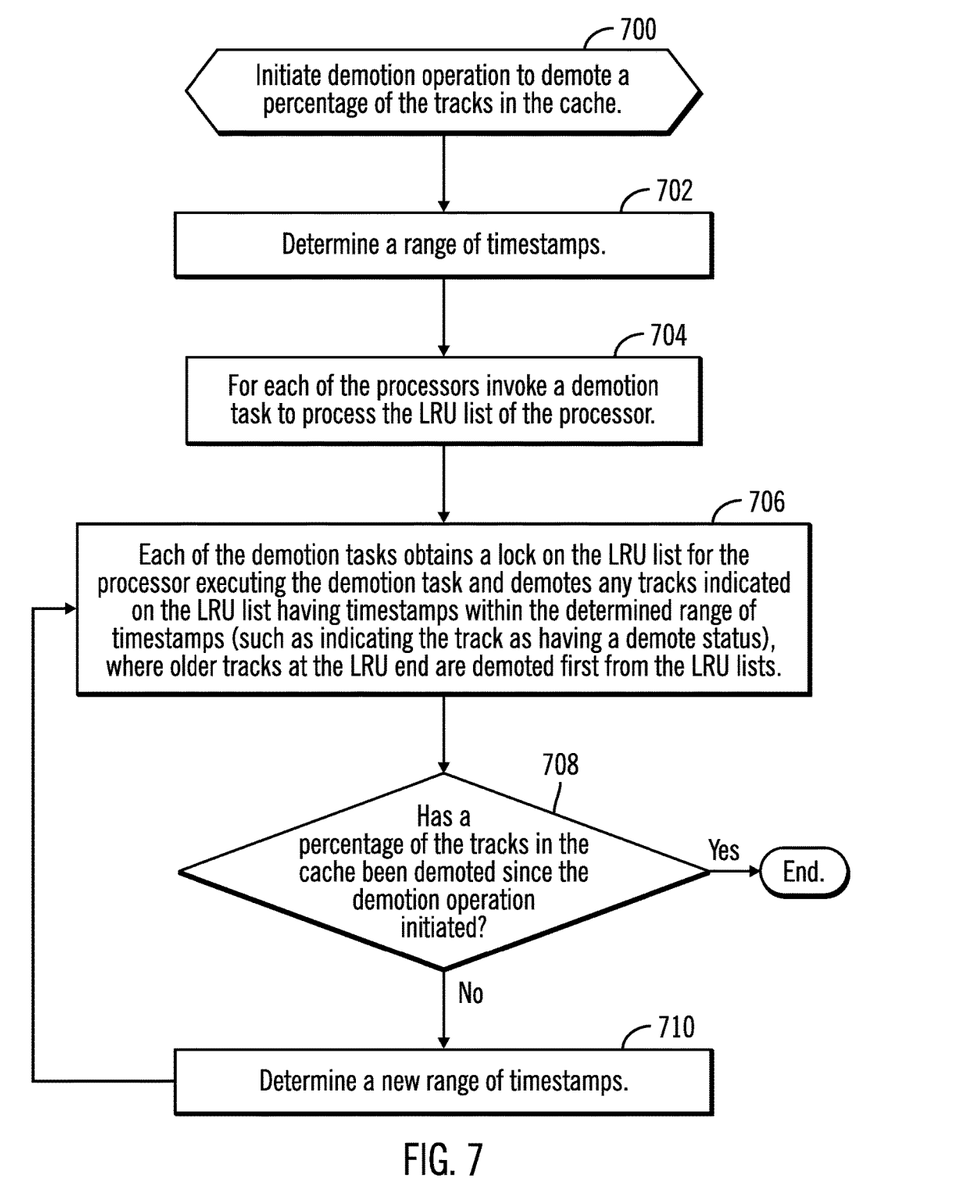
FIGS. 7 and 9 illustrate embodiments of operations to demote a track from cache.

FIG. 7 illustrates an embodiment of a demotion operation performed by the cache manager 120 and demotion tasks 126 executed by the processors 112 to demote a predetermined percentage of the tracks in the cache 116 when the cache 116 is full or has reached a recent threshold level of tracks. The predetermined percentage may comprise a percentage empirically determined as providing an optimal amount of the cache 116 to remain free. Upon initiating (at block 700) an operation to demote the predetermined percentage of tracks in the cache 116, the cache manager 120 determines (at block 702) a range of timestamps of tracks to demote. A demotion task is invoked (at block 704) by each of the processors $112_i$ to process the LRU list $120_i$ for the processor $112_i$ to demote tracks having timestamps 308 within the determined range of timestamps. Each of the demotion tasks 126 obtains (at block 706) a lock 408 on the LRU list $200_i$ for the processor $112_i$ executing the demotion task 126 and demotes any tracks indicated on the LRU list $112_i$ having timestamps 308 within the determined range of timestamps. A track may be demoted by indicating the demote status 310 as demote. Further, when demoting tracks indicated in the LRU lists 200 that fall within the determined range of timestamps, the tracks having the oldest timestamps, i.e., at the LRU end 204 of the LRU lists 200 are demoted first. In this way, the oldest tracks distributed across all the LRU lists 200 are demoted first because such tracks have a higher likelihood of not experiencing a cache hit, thus maximizing the cache hit ratio, or likelihood that tracks are available in cache when an access request is directed to the track.

After all the processors 112 executing their demotion tasks 126 have completed demotion operations, the cache manager 120 determines (at block 708) whether the predetermined percentage of tracks in the cache 116 have been demoted since the demotion operation initiated at block 700.

If not, then the cache manager 120 determines (at block 710) a new range of timestamps and returns to block 704 to have the processors 112 invoke the demotion task 126 to demote tracks in their LRU lists 200 having timestamps 308 within this new determined range. If (at block 708) the predetermined percentage of tracks have been demoted from the cache 116, then control ends.

In one embodiment, the determination of the range of timestamps at blocks 702 and 710 may be determined based on timestamps of tracks in an LRU list 200 having a track with an oldest timestamp, i.e., has been in the cache 116 the longest, across all the LRU lists 200. The determined range of timestamps may be based on an oldest and newest timestamps of the tracks indicated in one of the LRU lists 120, such as the LRU list 120 indicating a track having the oldest timestamp, and the predetermined percentage of tracks to demote from the cache.

In one embodiment, the demotion tasks 126 executed on the different processors 112 may execute in parallel to demote tracks from the different LRU lists 200 in parallel. In alternative embodiments, the LRU lists 200 may be serially processed for demotion of tracks.

Figure 8:
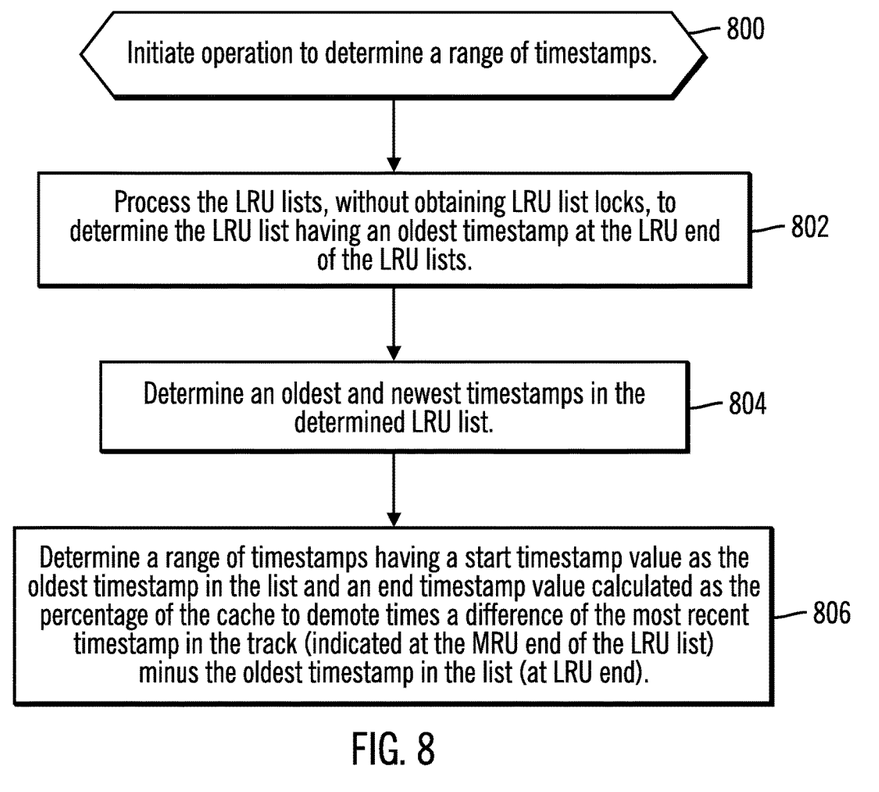
FIG. 8 illustrates an embodiment of operations to determine a range of timestamps of tracks to demote from cache.

FIG. 8 illustrates an embodiment of operations performed by the cache manager 120 to determine the range of timestamps, such as performed at steps 702 and 710 in FIG. 7. Upon initiating (at block 800) the operation to determine the range of timestamps, the cache manager 120 processes (at block 802) the LRU lists 200, without obtaining the locks 408 for the LRU lists 200, to determine the LRU list having an oldest timestamp at the LRU end 204 of the lists 200. In this way, the cache manager 120 avoids lock contention by processing the LRU lists 200 to determine timestamp values without obtaining the locks 408 for the LRU lists 200. A newest and oldest timestamps are determined (at block 804) from the determined LRU list $200_i$, such as the timestamps at the MRU 202 and LRU 204 ends of the determined list $200_i$. The range of timestamps is then determined (at block 806) from the determined list as having a start timestamp value as the oldest timestamp in the LRU list $200_i$ and end timestamp value of the range calculated as the predetermined percentage of the cache to demote times a difference of the most recent timestamp in the track (indicated at the MRU end 202 of the LRU list $200_i$) minus the oldest timestamp in the list (at LRU end 204). Equation (1) below provides an embodiment of this calculation for the end value of the range:

$$\text{Percentage to Demote} * (\text{Newest Timestamp} - \text{Oldest Timestamp}). \qquad (1)$$

In described embodiments, the percentage used to determine the end timestamp value of the range, such as in equation (1) above, is calculated using the predetermined percentage of the amount of tracks in the cache 116 to demote. In alternative embodiments, a percentage different from the percentage of the cache 116 to demote may be used to determine the end timestamp value of the range.

Figure 9:
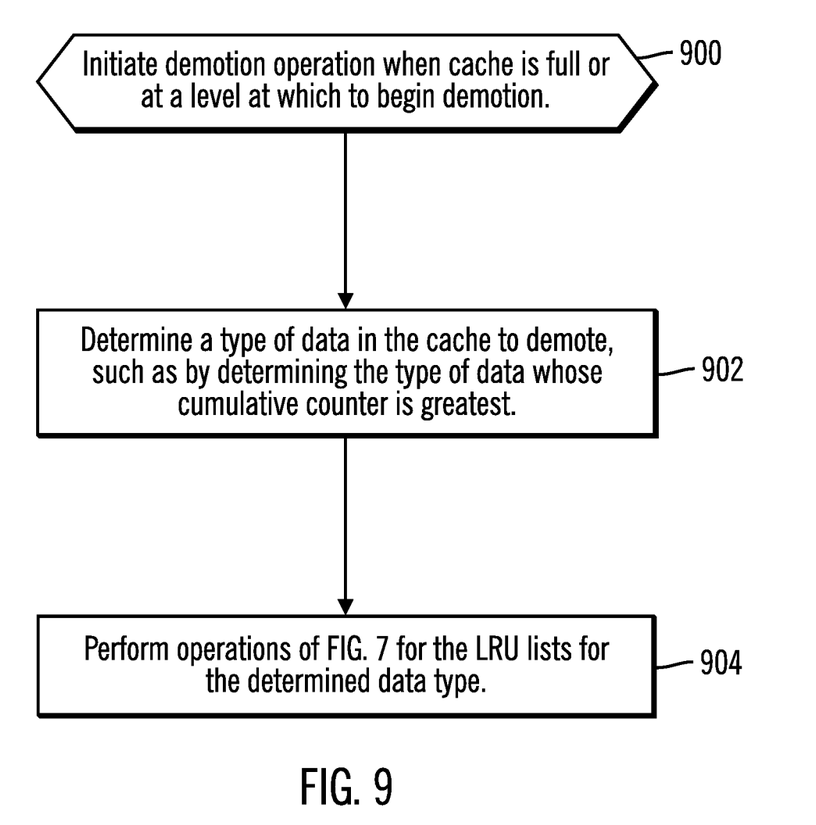

FIG. 9 illustrates an embodiment of operations performed by the cache manager 120 to determine a track to demote from cache 116 when there are multiple sets of LRU lists for different data types, such as the sets of LRU lists 502 and 504. Upon initiating (at block 900) the operation to select a track to demote from the cache 116, the cache manager 120 determines (at block 902) a type of data in the cache 116 to demote. In one embodiment, the cache manager 120 may execute an algorithm to select a data type such that the selection will have the minimal impact on the cache hit ratio, i.e., maximize the cache hit ratio. In one embodiment, this may be selecting the data type whose cumulative counter 506 and 508 is the greatest. In alternative embodiments, other techniques may be used such as by selecting a data type whose data has been less frequently accessed in the cache 116. The cache manager 120 may then perform the operations of FIG. 7 for the LRU lists 502, 504 for the determined data type, e.g., unmodified sequential data and unmodified non-sequential data.

Described embodiments provide techniques for partitioning LRU lists by processor, such that there is one LRU list per processor. In this way, contention is reduced by assigning each processor an LRU list to process. Further, when demoting tracks from cache, the LRU lists for the different processors are processed to remove tracks having timestamps within a determined range of timestamps. The range of timestamps may be determined based on a percentage of tracks in the cache to demote and an oldest and newest timestamps in one of the LRU lists, such as the LRU list indicating a track having the oldest timestamp of the tracks in the cache. Demoting tracks within a determined timestamp range from all the LRU lists ensures that the oldest tracks in the cache get demoted first because tracks having the oldest timestamps may be distributed across multiple of the LRU lists.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
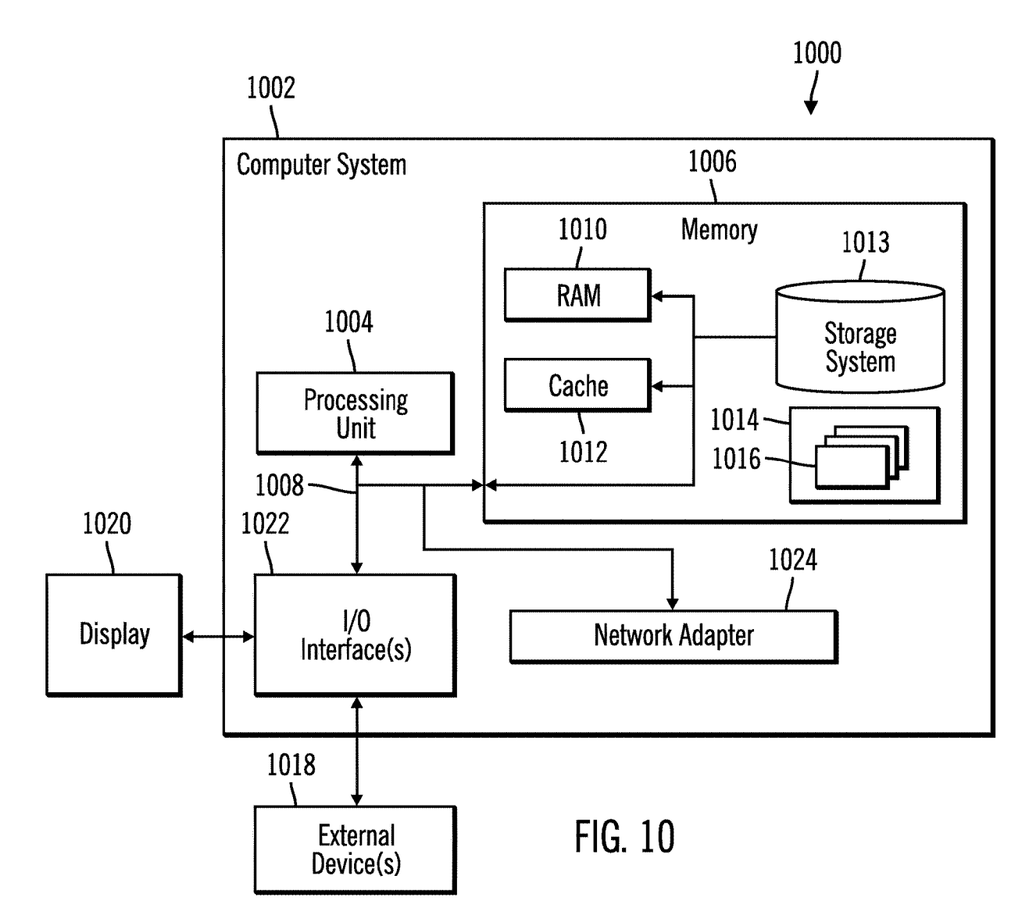
FIG. 10 illustrates a computing environment in which the components of FIG. 1 may be implemented.

The computational components of FIG. 1, including the hosts 102*a*, 102*b* . . . 102*n* and storage controller 104, may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache accessed by a plurality of processors, the computer program product comprising a computer readable storage medium having computer readable program code embodied therein that when executed performs operations, the operations comprising:

allocating a cache control block for a track to add to the cache;

determining a cache list of a plurality of cache lists for the track to add to the cache, wherein each of the cache lists is assigned to one of the plurality of processors, wherein each of the processors processes the cache list to which it is assigned to demote tracks indicated in the cache list; and indicating the track to add to the cache in the determined cache list.

2. The computer program product of claim 1, wherein the operations further comprise:

maintaining an assignment of free queues of available cache control blocks to the processors, wherein the allocating the cache control block comprises allocating the cache control block from a free queue of the free queues assigned to a processor initiating a request to add the track to the cache.

3. The computer program product of claim 1, wherein the allocating the cache control block comprises allocating the cache control block from a free queue, wherein the determining the cache list assigned to one of the processors comprises applying a function to the cache control block to evenly distribute tracks among the cache lists.

4. The computer program product of claim 1, wherein the determining the cache list comprises selecting the cache list to balance a distribution of tracks to the cache lists.

5. The computer program product of claim 1, wherein for each of the cache lists, there is a lock for each of the cache lists that needs to be obtained to demote tracks indicated in the cache list, wherein the operations further comprise:

obtaining the lock to the determined cache list, wherein the track is indicated in the determined cache list in response to obtaining the lock for the determined cache list.

6. The computer program product of claim 1, wherein each of the processors is assigned a plurality of cache lists, one cache list for each of a plurality of data types, wherein the operations further comprise:
   determining a data type of the track to add to the cache, wherein the determined cache list comprises a cache list for the determined data type assigned to one of the processors.

7. The computer program product of claim 6, wherein the data types for which there are separate cache lists for the processors include unmodified sequentially accessed data and unmodified non-sequentially accessed data.

8. The computer program product of claim 1, wherein the operations further comprise:
   invoking, by each processor of the processors, a demotion task to separately process the cache list for the processor to demote the tracks indicated in the cache list.

9. A system for managing tracks in a storage, comprising:
   a plurality of processors;
   a cache; and
   a cache manager that when executed performs operations, the operations comprising:
      allocating a cache control block for a track to add to the cache;
      determining a cache list of a plurality of cache lists for the track to add to the cache, wherein each of the cache lists is assigned to one of the plurality of processors, wherein each of the processors processes the cache list to which it is assigned to demote tracks indicated in the cache list; and
      indicating the track to add to the cache in the determined cache list.

10. The system of claim 9, wherein the operations further comprise:
   maintaining an assignment of free queues of available cache control blocks to the processors, wherein the allocating the cache control block comprises allocating the cache control block from a free queue of the free queues assigned to a processor initiating a request to add the track to the cache.

11. The system of claim 9, wherein the allocating the cache control block comprises allocating the cache control block from a free queue, wherein the determining the cache list assigned to one of the processors comprises applying a function to the cache control block to evenly distribute tracks among the cache lists.

12. The system of claim 9, wherein the determining the cache list comprises selecting the cache list to balance a distribution of tracks to the cache lists.

13. The system of claim 9, wherein for each of the cache lists, there is a lock for each of the cache lists that needs to be obtained to demote tracks indicated in the cache list, wherein the operations further comprise:
   obtaining the lock to the determined cache list, wherein the track is indicated in the determined cache list in response to obtaining the lock for the determined cache list.

14. The system of claim 9, wherein each of the processors is assigned a plurality of cache lists, one cache list for each of a plurality of data types, wherein the operations further comprise:
   determining a data type of the track to add to the cache, wherein the determined cache list comprises a cache list for the determined data type assigned to one of the processors.

15. A method for managing tracks in a storage in a cache, comprising:
   allocating a cache control block for a track to add to the cache;
   determining a cache list of a plurality of cache lists for the track to add to the cache, wherein each of the cache lists is assigned to one of a plurality of processors, wherein each of the processors processes the cache list to which it is assigned to demote tracks indicated in the cache list; and
   indicating the track to add to the cache in the determined cache list.

16. The method of claim 15, further comprising:
   maintaining an assignment of free queues of available cache control blocks to the processors, wherein the allocating the cache control block comprises allocating the cache control block from a free queue of the free queues assigned to a processor initiating a request to add the track to the cache.

17. The method of claim 15, wherein the allocating the cache control block comprises allocating the cache control block from a free queue, wherein the determining the cache list assigned to one of the processors comprises applying a function to the cache control block to evenly distribute tracks among the cache lists.

18. The method of claim 15, wherein the determining the cache list comprises selecting the cache list to balance a distribution of tracks to the cache lists.

19. The method of claim 15, wherein for each of the cache lists, there is a lock for each of the cache lists that needs to be obtained to demote tracks indicated in the cache list, further comprising:
   obtaining the lock to the determined cache list, wherein the track is indicated in the determined cache list in response to obtaining the lock for the determined cache list.

20. The method of claim 15, wherein each of the processors is assigned a plurality of cache lists, one cache list for each of a plurality of data types, further comprising:
   determining a data type of the track to add to the cache, wherein the determined cache list comprises a cache list for the determined data type assigned to one of the processors.

* * * * *